(No Model.)
J. L. WOLCOTT.
RELIEF COCK.
No. 273,213.  Patented Feb. 27, 1883.
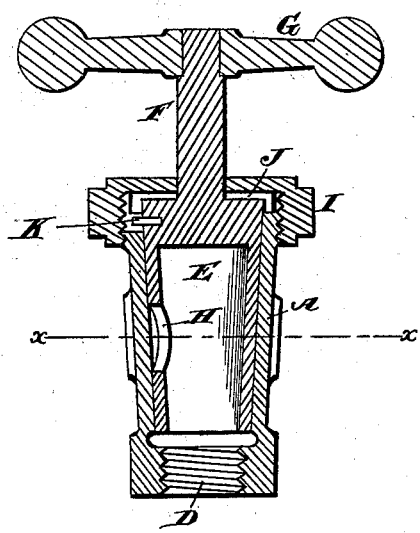
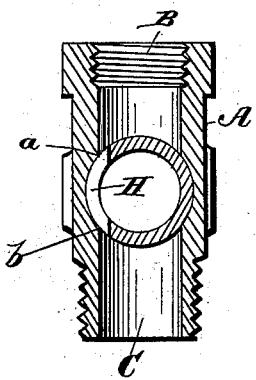
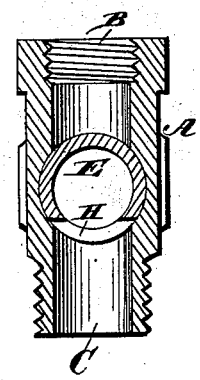
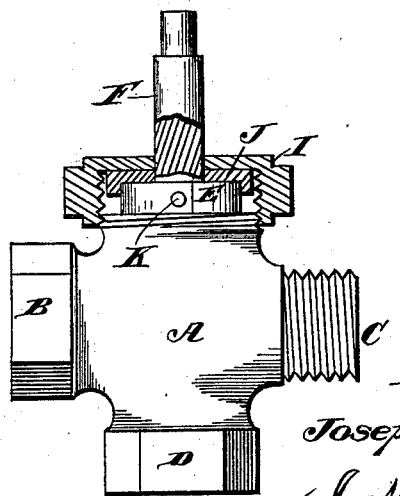
Witnesses.
Robert Everett
George W. Rea
Inventor.
Joseph L. Wolcott
By J. N. Elouse Atty.

UNITED STATES PATENT OFFICE.

JOSEPH L. WOLCOTT, OF TOLEDO, OHIO, ASSIGNOR TO SHAW KENDALL & CO., OF SAME PLACE.

RELIEF-COCK.

SPECIFICATION forming part of Letters Patent No. 273,213, dated February 27, 1883.

Application filed April 27, 1882. (No model.)

*To all whom it may concern:*

Be it known that I, JOSEPH L. WOLCOTT, a citizen of the United States, residing at Toledo, in the county of Lucas and State of Ohio, have invented new and useful Improvements in Relief-Cocks, of which the following is a specification.

The object of this invention is to provide a simple and efficient relief cock or valve for changing the flow of water or other fluid from one pipe or hose to another and at the same time avoid the sudden reaction upon pipes, air-chambers, valves, &c., which is usually caused by entirely closing or cutting off the flow of fluid in one direction before a flow is permitted in another.

The object of my invention I accomplish by the construction of cock or valve illustrated in the accompanying drawings, in which—

Figure 1 is a vertical central sectional view of a relief cock or valve embodying my invention; Fig. 2, a transverse sectional view on the line $x\,x$ of Fig. 1 with the valve-plug in its position of relief; Fig. 3, a view similar to Fig. 2 with the valve-plug in position, closing the flow of fluid in one direction and permitting the flow thereof in the opposite direction; and Fig. 4 is an elevation, partly in section, showing the arrangement of the fluid receiving and discharging orifices or nozzles.

The valve-casing A is constructed with two orifices or nozzles, B and C, which extend laterally from the casing in opposite directions for the discharge of the water or other fluid, while between the said orifices or nozzles is arranged the orifice or nozzle D, for receiving the water or fluid from the source of supply. The valve-plug E is hollow, with a closed upper end, from which projects the stem F, carrying a hand-wheel or handle, G, by which to rotate the plug in the casing. The lower open end of the plug is at all times in communication with the fluid receiving orifice or nozzle D, and the wall of the hollow plug is constructed with a transverse elongated valve-opening, H, which is of a length somewhat greater than the longitudinal length of that part of the wall of the casing against which the walls of the plug rest, as represented between the lines $a\,b$ at Fig. 2, the object of which arrangement is that the flow of fluid through one of the discharge-orifices cannot be entirely closed before a flow of fluid is permitted through the other discharge orifice or nozzle. The valve-plug is secured in proper position by a nut, I, screwed upon a threaded extension of the casing A, and between the nut and the closed end of the plug is arranged a packing-ring, J, to provide a tight joint between the parts. A stop-pin, K, is secured to the valve-plug, and extends through a recess in the upper portion of the valve-casing, for limiting and determining the rotation of the valve-plug, so that the flow of fluid can be directed entirely through one of the discharge orifices or nozzles B or C. The receiving orifice or nozzle D is connected with the source of fluid-supply, and such fluid can be directed through either one of the discharge orifices or nozzles by properly adjusting the valve-plug.

It will be obvious that by the described arrangement of parts and the length of the valve-opening in the plug the flow of fluid through one of the discharge orifices or nozzles cannot be entirely closed before a flow of fluid is permitted through the other discharge orifice or nozzle. Hence the usual water-hammering is avoided, which results by the sudden reaction of the fluid on the pipes, air-chambers, valves, &c., with which the fluid-conducting pipes are connected. When the valve-plug is in the position represented by Fig. 3 the entire flow of fluid is from the receiving orifice or nozzle through the discharge orifice or nozzle C, and if it is desired to change the flow of fluid through the discharge orifice or nozzle B the valve-plug is rotated in the casing, and in such rotation the valve-opening H will assume the position shown in Fig. 2, where it will be seen that one end of the valve-opening is in a position to permit a partial flow of fluid through the orifice or nozzle B before the other end of the valve-opening is in position to entirely close the discharge through the orifice or nozzle C.

It should be remarked that the discharge orifices or nozzles are connected with suitable fluid-conducting pipes or hose.

Having thus described my invention, what I claim is—

In a relief-cock, the combination, with the valve-casing constructed with lateral orifices or nozzles for the discharge of fluid, and an orifice or nozzle between the same for receiving the fluid, of the hollow plug closed at its top, and having an open end in communication with the fluid-receiving orifice or nozzle, and provided with the transverse valve-opening, formed as described, to permit the flow of fluid through one discharge-orifice before the flow through the other discharge-orifice is completely cut off, substantially as and for the purposes set forth.

In testimony whereof I have hereunto set my hand in the presence of two subscribing witnesses.

JOSEPH L. WOLCOTT.

Witnesses:
PAUL RAYMOND,
H. P. PLATT.